US012752659B2

(12) United States Patent
Okaichi et al.

(10) Patent No.: US 12,752,659 B2
(45) Date of Patent: Oct. 6, 2026

(54) CHARGE AND DISCHARGE CONTROL DEVICE, DISCHARGE LOWER LIMIT SETTING DEVICE, CHARGE AND DISCHARGE CONTROL METHOD, AND RECORDING MEDIUM

(71) Applicant: Panasonic Intellectual Property Management Co., Ltd., Osaka (JP)

(72) Inventors: Atsuo Okaichi, Osaka (JP); Fumiaki Suzuki, Osaka (JP); Noriyoshi Shimizu, Osaka (JP); Kazue Fusakawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 48 days.

(21) Appl. No.: 19/099,246

(22) PCT Filed: Jul. 3, 2023

(86) PCT No.: PCT/JP2023/024560
§ 371 (c)(1),
(2) Date: Jan. 28, 2025

(87) PCT Pub. No.: WO2024/034288
PCT Pub. Date: Feb. 15, 2024

(65) Prior Publication Data

US 2026/0145566 A1 May 28, 2026

(30) Foreign Application Priority Data

Aug. 10, 2022 (JP) ................................ 2022-127612

(51) Int. Cl.
*B60L 53/62* (2019.01)
*B60L 53/66* (2019.01)
(Continued)

(52) U.S. Cl.
CPC ............... *B60L 53/62* (2019.02); *B60L 53/66* (2019.02); *B60L 53/68* (2019.02); *B60L 55/00* (2019.02);
(Continued)

(58) Field of Classification Search
CPC .......... B60L 53/62; B60L 53/66; B60L 53/68; B60L 55/00; B60L 2240/622;
(Continued)

(56) References Cited

U.S. PATENT DOCUMENTS

2015/0081122 A1* 3/2015 Yonetani ............ G06Q 10/0631 700/291
2017/0136911 A1* 5/2017 Ricci ..................... B60L 53/122
(Continued)

FOREIGN PATENT DOCUMENTS

JP 2007-330083 A 12/2007
JP 2015-019501 A 1/2015
(Continued)

OTHER PUBLICATIONS

International Search Report (ISR) issued on Sep. 19, 2023 in International (PCT) Application No. PCTJP2023/024560.
(Continued)

*Primary Examiner* — Behrang Badii
(74) *Attorney, Agent, or Firm* — Rimon P.C.

(57) ABSTRACT

A charge and discharge control device includes: a power consumption obtainer that obtains a power consumption of a residential complex; a power amount accumulator that stores first history information including a history of the power consumption; a power amount predictor that predicts a first power consumption of a residential complex in future; a storage battery information accumulator that stores second history information including a history of storage battery information related to charge and discharge of a storage
(Continued)

battery included in an electric vehicle; a charge and discharge control setter that sets a discharge lower limit, the discharge lower limit indicating a remaining battery capacity at which to stop discharge performed for supplying power from the storage battery to the residential complex in the first period; and a charge and discharge planner that creates a charge and discharge plan including the discharge in the first period.

21 Claims, 9 Drawing Sheets

(51) Int. Cl.

| | |
|---|---|
| ***B60L 53/68*** | (2019.01) |
| ***B60L 55/00*** | (2019.01) |
| ***H02J 3/00*** | (2006.01) |
| ***H02J 3/466*** | (2026.01) |
| *H02J 103/30* | (2026.01) |
| *H02J 103/40* | (2026.01) |
| *H02J 105/12* | (2026.01) |
| *H02J 105/37* | (2026.01) |

(52) U.S. Cl.
CPC .............. *H02J 3/003* (2020.01); *H02J 3/466* (2020.01); *B60L 2240/622* (2013.01); *B60L 2240/662* (2013.01); *H02J 2103/30* (2026.01); *H02J 2103/40* (2026.01); *H02J 2105/12* (2026.01); *H02J 2105/37* (2026.01)

(58) Field of Classification Search
CPC .... B60L 2240/662; B60L 53/63; B60L 53/67; B60L 58/12; B60L 2240/66; B60L 2240/80; B60L 2250/12; B60L 2250/16; B60L 2260/50; B60L 2260/54; B60L 53/64; H02J 3/003; H02J 3/466; H02J 2103/30; H02J 2103/40; H02J 2105/12; H02J 2105/37; H02J 7/40; H02J 3/322; H02J 7/82; H02J 7/92; Y02T 10/70
See application file for complete search history.

(56) References Cited

U.S. PATENT DOCUMENTS

| | | | | |
|---|---|---|---|---|
| 2017/0345107 | A1* | 11/2017 | Hirata ..................... | B60L 53/51 |
| 2020/0282855 | A1 | 9/2020 | Slutzky et al. | |

FOREIGN PATENT DOCUMENTS

| | | | |
|---|---|---|---|
| JP | 2015-148528 | A | 8/2015 |
| JP | 2015-220862 | A | 12/2015 |
| JP | 2020-054070 | A | 4/2020 |
| JP | 2021-019455 | A | 2/2021 |
| JP | 2021-180548 | A | 11/2021 |
| JP | 2022-070363 | A | 5/2022 |
| WO | 2012/098660 | A1 | 7/2012 |
| WO | 2021/220470 | A1 | 11/2021 |

OTHER PUBLICATIONS

Extended European Search Report dated Dec. 4, 2025 issued in the corresponding European Patent Application No. 23852271.8.

* cited by examiner

| Date | Time of day | Remaining battery capacity | Traveled distance |
|---|---|---|---|
| | ... | ... | |
| 3/2 | 1:00 | 30% | 6500 km |
| | ... | ... | |
| 3/2 | 7:00 | 80% | 6500 km |
| 3/5 | 1:30 | 40% | 6600 km |
| | ... | ... | |
| 3/5 | 7:00 | 80% | 6600 km |
| | ... | ... | |

CHARGE AND DISCHARGE CONTROL DEVICE, DISCHARGE LOWER LIMIT SETTING DEVICE, CHARGE AND DISCHARGE CONTROL METHOD, AND RECORDING MEDIUM

CROSS-REFERENCE TO RELATED APPLICATIONS

This application is the U.S. National Phase under 35 U.S.C. § 371 of International Application No. PCT/JP2023/024560, filed on Jul. 3, 2023, which claims the benefit of foreign priority to Japanese Patent Application No. 2022-127612 filed on Aug. 10, 2022, the entire contents of each of which are hereby incorporated by reference.

TECHNICAL FIELD

The present invention relates to a charge and discharge control device, a discharge lower limit setting device, a charge and discharge control method, and a recording medium.

BACKGROUND ART

There is a service in which, in a residential complex, a management company or a management association enters into a high-voltage bulk power supply contract with an electric power company, resulting in lower electricity rates than if each dwelling unit enters into a separate electricity contract. Under a high-voltage bulk power supply contract, the lower a maximum power demand (for example, an average power per 30 minutes), the lower the electricity rate. If the maximum power demand exceeds contracted power, the contracted power for a predetermined period (for example, the following fiscal year) may increase, resulting in a larger electricity bill burden.

In consideration thereof, a technique has been proposed to use electric vehicles (EVs) owned by residents of a residential complex in order to ensure that a contracted power set for the entire residential complex is not exceeded. For example, Patent Literature (PTL) 1 discloses a device that controls discharge to a storage battery of a dischargeable electric vehicle by referring to discharge permission information set in advance by a user (owner) of the electric vehicle when a peak value of total power consumption (for example, a maximum power demand) of an entire residential complex is predicted to exceed a contracted power so that the contracted power is not exceeded.

CITATION LIST

[PTL 1] Japanese Unexamined Patent Application Publication No. 2021-180548

SUMMARY OF INVENTION

Technical Problem

However, with the device according to PTL 1, when the user sets a discharge lower limit as the discharge permission information, the discharge lower limit may not be set appropriately because there is no indicator of what value should be set as the discharge lower limit.

In view of the above, the present invention provides a charge and discharge control device, a discharge lower limit setting device, a charge and discharge control method, and a recording medium that can assist in setting a more appropriate discharge lower limit.

Solution to Problem

A charge and discharge control device according to an aspect of the present invention is a charge and discharge control device that controls charge and discharge of an electric vehicle in a residential complex that includes a charge and discharge facility, the charge and discharge control device including: a first obtainer that obtains a power consumption of the residential complex; a first storage that stores first history information including a history of the power consumption of the residential complex; a predictor that predicts a first power consumption of the residential complex in future based on the first history information; a second obtainer that obtains storage battery information related to charge and discharge of a storage battery included in the electric vehicle; a second storage that stores second history information including a history of the storage battery information; a setter that sets a discharge lower limit based on the second history information when power is predicted to be scarce in a first period in future based on the first power consumption, the discharge lower limit indicating a remaining battery capacity at which to stop discharge performed for supplying power from the storage battery included in the electric vehicle to the residential complex in the first period; and a plan creator that creates a charge and discharge plan including the discharge in the first period, based on the first power consumption and the discharge lower limit.

A discharge lower limit setting device according to an aspect of the present invention is a discharge lower limit setting device that sets a discharge lower limit for use in a charge and discharge control device that controls charge and discharge of an electric vehicle in a residential complex that includes a charge and discharge facility, the discharge lower limit setting device including: a setter that sets a discharge lower limit based on history information including a history of storage battery information related to charge and discharge of a storage battery included in the electric vehicle when power is predicted, by the charge and discharge control device, to be scarce in a first period in future, the discharge lower limit indicating a remaining battery capacity at which to stop discharge performed for supplying power from the storage battery included in the electric vehicle to the residential complex in the first period; and an outputter that outputs to the charge and discharge control device the discharge lower limit that has been set.

A charge and discharge control method according to an aspect of the present invention is a charge and discharge control method of controlling charge and discharge of an electric vehicle in a residential complex that includes a charge and discharge facility, the charge and discharge control method including: obtaining a power consumption of the residential complex; predicting a first power consumption of the residential complex in future based on first history information including a history of the power consumption of the residential complex obtained; obtaining storage battery information related to charge and discharge of a storage battery included in the electric vehicle; setting a discharge lower limit based on second history information including a history of the storage battery information when power is predicted to be scarce in a first period in future based on the first power consumption, the discharge lower limit indicating a remaining battery capacity at which to stop discharge performed for supplying power from the storage battery included in the electric vehicle to the residential complex in the first period; and creating a charge and discharge plan including the discharge in the first period, based on the first power consumption and the discharge lower limit.

A recording medium according to an aspect of the present invention is a non-transitory computer-readable recording medium having recorded thereon a program for causing a computer to execute the charge and discharge control method described above.

Advantageous Effects of Invention

According to an aspect of the present invention, it is possible to realize a charge and discharge control device and so on that can assist in setting a more appropriate discharge lower limit.

DESCRIPTION OF EMBODIMENTS

Figure 1:
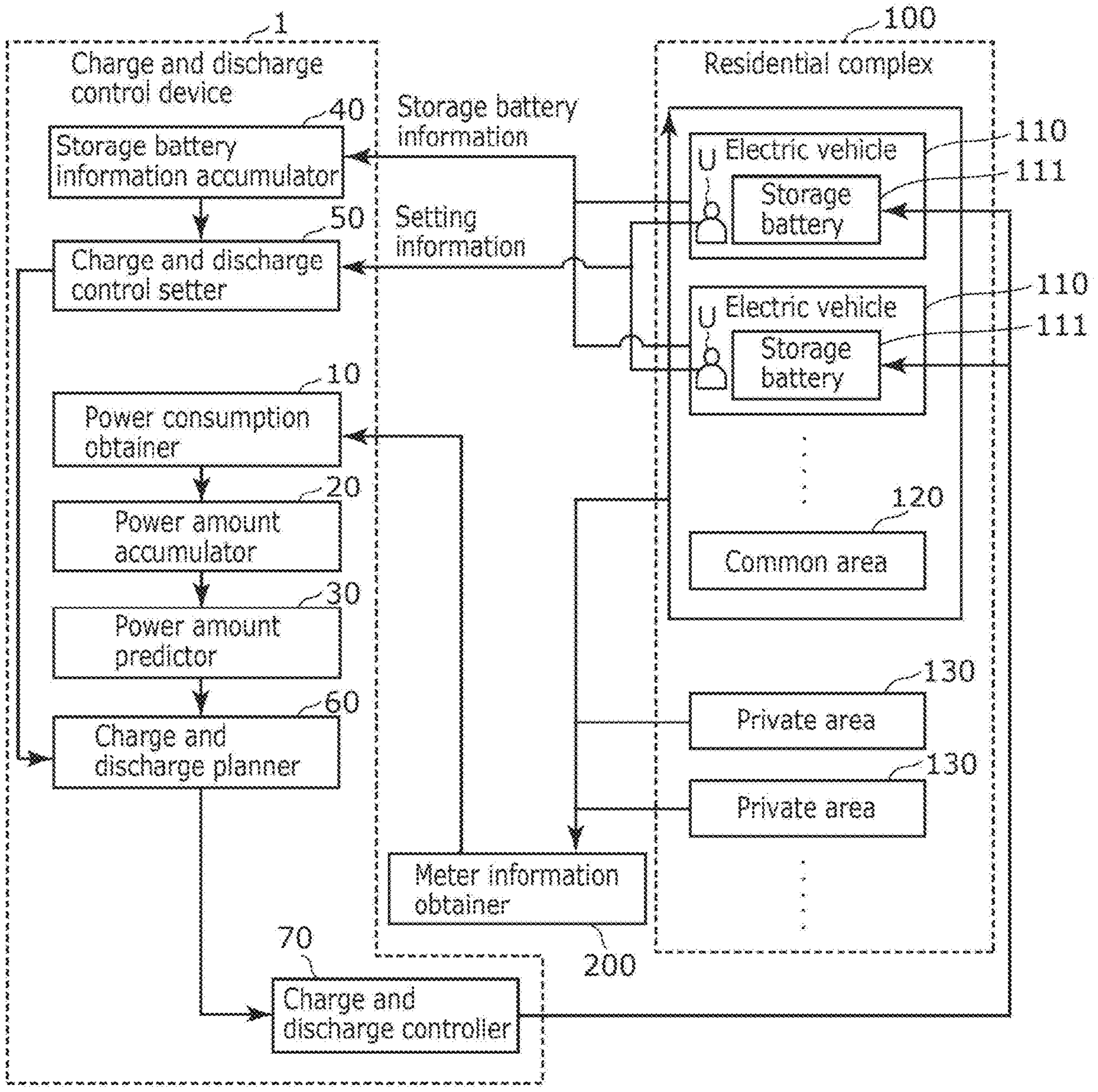
FIG. 1 is a block diagram illustrating a configuration of a charge and discharge control system according to an embodiment.

Hereinafter, embodiments will be specifically described with reference to the drawings.

Note that the following embodiments each illustrate a general or specific example. The numerical values, constituent elements, the arrangement and connection of the constituent elements, steps, the processing order of the steps etc. illustrated in the following embodiments are mere examples, and are not intended to limit the present invention. Among the constituent elements in the following embodiments, those not recited in any of the independent claims will be described as optional constituent elements.

Furthermore, the drawings are represented schematically and are not necessarily precise illustrations. Therefore, the scales, for example, are not necessarily consistent from drawing to drawing. In the drawings, constituent elements that are substantially the same are given the same reference signs, and redundant descriptions will be omitted or simplified.

In the present Description, terms that indicate relationships between elements such as "the same", numerical values, and numerical ranges do not express their strict meanings only, but also include substantially equivalent ranges, e.g., differences of several percent (or about 10%).

In the present Description, ordinal numerals such as "first" and "second" do not mean the number of or the order of constituent elements unless stated otherwise in particular. The ordinal numerals are used to avoid confusion of and distinguish between constituent elements of the same type.

EMBODIMENT

Hereinafter, a charge and discharge control system including a charge and discharge control device according to the present embodiment will be described with reference to FIGS. 1 to 11.

1. Configuration of Charge and Discharge Control System

First, a configuration of a charge and discharge control system according to the present embodiment will be described with reference to FIGS. 1 to 4. FIG. 1 is a block diagram illustrating a configuration of the charge and discharge control system according to the present embodiment. Hereinafter, it is assumed that a manager of residential complex 100 has entered into a high-voltage bulk power supply contract with an electric power company and at least one of the residents owns electric vehicle 110.

As illustrated in FIG. 1, the charge and discharge control system includes charge and discharge control device 1, each facility provided in residential complex 100, and meter information obtainer 200. Meter information obtainer 200 may be provided in residential complex 100.

Charge and discharge control device 1 is an information processing device that controls charge and discharge of electric vehicle 110 in residential complex 100 including a charge and discharge facility and assists, for example, user U being a resident of residential complex 100 to set a more appropriate discharge lower limit. While the discharge lower limit will be described with reference to FIG. 4 to be described later, the discharge lower limit indicates a remaining battery capacity upon stopping discharge of storage battery 111 of electric vehicle 110 when storage battery 111 is discharged to supply power to residential complex 100.

When a high value is set as the discharge lower limit, it may not be possible to control discharge to or below a contracted power. Alternatively, when a low value is set as the discharge lower limit, user U may run out of power when using electric vehicle 110 after discharge. In consideration thereof, charge and discharge control device 1 assists in setting an appropriate discharge lower limit for user U using, for example, a history of usage of electric vehicle 110 owned by user U.

Charge and discharge control device 1 includes power consumption obtainer 10, power amount accumulator 20, power amount predictor 30, storage battery information accumulator 40, charge and discharge control setter 50, charge and discharge planner 60, and charge and discharge controller 70.

Power consumption obtainer 10 obtains power consumption (information indicating power consumption) of residential complex 100 via meter information obtainer 200. For example, power consumption obtainer 10 obtains power consumption of entire residential complex 100. As the power consumption, an amount of power that is consumed (power consumption) by a charge and discharge facility (or a charge facility) installed in residential complex 100, electrical devices installed in common area 120 and private areas 130, and the like is obtained. Power consumption obtainer 10 includes a communication circuit (communication module) and obtains power consumption via communication from meter information obtainer 200.

Note that power consumption obtainer 10 may obtain power consumption directly from each electrical device of residential complex 100 and the like. Power consumption obtainer 10 is an example of the first obtainer.

Power amount accumulator 20 accumulates power consumption for a predetermined period obtained by power consumption obtainer 10. Power amount accumulator 20 can be described as storing information including a history of power consumption of residential complex 100. Although not particularly limited, the predetermined period may be a few months or a few years. Power amount accumulator 20 is realized by, for example, a hard disk, a semiconductor memory, or the like. In addition, power amount accumulator 20 is an example of the first storage and the information including a history of power consumption is an example of the first history information. Hereinafter, the information including a history of power consumption will also be described as first history information.

Power amount predictor 30 predicts power consumption to be consumed in residential complex 100 in the future based on the first history information stored in power amount accumulator 20. The future may be any time at or after the current time and is, for example, the following day. While an example in which power amount predictor 30 predicts a power consumption of the following day will be described hereinafter, a target period to be predicted is not limited to the following day. In addition, power amount predictor 30 predicts a power consumption (maximum power demand) of entire residential complex 100 for each predetermined period (for example, 30 minutes).

While an example of a method used by power amount predictor 30 to predict power consumption will be described later, the method is not particularly limited. Power amount predictor 30 is an example of the predictor and the power consumption predicted by power amount predictor 30 is an example of the first power consumption. Hereinafter, the power consumption predicted by power amount predictor 30 will also be described as the first power consumption.

Storage battery information accumulator 40 obtains and accumulates storage battery information related to charge and discharge of storage battery 111 included in electric vehicle 110. Storage battery information accumulator 40 accumulates storage battery information for a predetermined period for each electric vehicle 110 or for each user U. Storage battery information accumulator 40 can be described as storing information including a history of storage battery information. Although not particularly limited, the predetermined period may be a few months or a few years. Storage battery information accumulator 40 is realized by, for example, a hard disk, a semiconductor memory, or the like. In addition, storage battery information accumulator 40 is an example of the second storage and the information including a history of storage battery information is an example of the second history information. Hereinafter, the information including a history of storage battery information will also be described as second history information.

The storage battery information may be obtained using a telematics system or the like from electric vehicle 110 or obtained from the charge and discharge facility by communication. For example, storage battery information accumulator 40 may include a communication circuit (communication module). Storage battery information accumulator 40 may function as the obtainer and the second obtainer.

Note that storage battery information accumulator 40 may store, as the second history information, identification information of electric vehicle 110 owned by user U of residential complex 100, identification information of user U, and a history of the storage battery information in association with each other. When there are a plurality of electric vehicles 110 in residential complex 100, storage battery information accumulator 40 may store, as second history information for each of the plurality of electric vehicles 110, identification information of electric vehicle 110, identification information of user U, and a history of the storage battery information in association with each other.

When power is predicted to be scarce during a certain time slot in the future based on the first history information, charge and discharge control setter 50 performs processing of setting (determining) a discharge lower limit during the time slot based on the second history information. Charge and discharge control setter 50 obtains setting information related to the setting of the discharge lower limit from user U and sets the discharge lower limit based on the obtained setting information. Charge and discharge control setter 50 sets, in the time slot, a discharge lower limit for each predetermined period (for example, 30 minutes). In addition, charge and discharge control setter 50 individually sets a discharge lower limit for each electric vehicle 110 or for each user U. Note that the time slot here means the time slot on the following day for which power amount predictor 30 to be described later makes a determination of Yes in step S104.

Note that charge and discharge control setter 50 need only set the discharge lower limit based on the second historical information and it is not essential to obtain the setting information from user U. Charge and discharge control setter 50 is an example of the setter.

Charge and discharge planner 60 creates a charge and discharge plan related to the charge and discharge of electric vehicle 110 based on the first power consumption predicted by power amount predictor 30 and the discharge lower limit set by charge and discharge control setter 50. The charge and discharge plan includes causing a discharge to be performed from storage battery 111 of electric vehicle 110 to residential complex 100 in the time slot in which power is predicted to be scarce. For example, when power is predicted to be scarce during the time slot based on the first power consumption and the contracted power, charge and discharge planner 60 creates a charge and discharge plan that causes storage battery 111 of electric vehicle 110 to discharge a necessary discharge amount based on the first power consumption and the contracted power so that the power consumption during the time slot is equal to or less than the contracted power. The charge and discharge plan includes how much to discharge during which time slot, the required number of electric vehicles 110, and when there are a plurality of electric vehicles 110 to be discharged, an order in which electric vehicles 110 are to be discharged. Charge and discharge planner 60 is an example of the plan creator.

Charge and discharge controller 70 issues a charge and discharge control command to the charge and discharge facility based on the charge and discharge plan created by charge and discharge planner 60. Charge and discharge controller 70 generates charge and discharge control information for causing storage battery 111 to be charged or discharged based on the charge and discharge plan and outputs the generated charge and discharge control information to, for example, the charge and discharge facility to which storage battery 111 is connected.

Note that charge and discharge control device 1 described above may be realized by a device installed on the premises of residential complex 100, by a device installed off the premises of residential complex 100, or by a combination of devices installed on and off the premises.

Note that charge and discharge control device 1 need not include storage battery information accumulator 40 and charge and discharge control setter 50. In this case, storage battery information accumulator 40 and charge and discharge control setter 50 may be realized as a discharge lower limit setting device that is separate from charge and discharge control device 1.

Residential complex 100 is a residence with a plurality of dwelling units that are partitioned within a single building, each partition being independent of the others, and includes common area 120 that is shared by residents and private areas 130 that correspond to portions of the respective dwelling units. Common area 120 includes entrances and hallways. Devices and the like that consume power are installed in common area 120 and private areas 130. For example, elevators, lighting systems, cameras, and the like are installed in common area 120 and home electrical appliances and the like are installed in private areas 130. In this manner, devices and the like that consume power are installed in plurality in residential complex 100.

In addition, the residents of residential complex 100 own electric vehicles 110 and a charge and discharge facility (charger/discharger) (not illustrated) for charging and discharging electric vehicles 110 is installed in residential complex 100. While the number of charge and discharge facilities is not particularly limited, there need only be one or more charge and discharge facilities. In addition, the charge and discharge facility may be included in common area 120.

Electric vehicle 110 is an example of the electric vehicle and is an electric vehicle that is owned by user U in residential complex 100. Electric vehicle 110 includes storage battery 111 and is capable of charge and discharge. In addition, electric vehicle 110 may be mounted with an electrical device that can experience a change in power consumption according to weather information. The electrical device is, for example, but not limited to, an air conditioner (car air conditioner). Note that the number of electric vehicles 110 included in the charge and discharge control system is not particularly limited.

Note that the electric vehicle included in the charge and discharge control system is not limited to electric vehicle 110 and need only be a vehicle that includes a storage battery and that can be charged and discharged by the charge and discharge facility included in residential complex 100. For example, the electric vehicle may be a hybrid car, a plug-in hybrid car, an electric motorcycle, an electric bicycle, or the like.

The charge and discharge facility is installed on the premises of residential complex 100 and charges or discharges storage battery 111 of electric vehicle 110 according to an instruction from charge and discharge control device 1.

Meter information obtainer 200 is installed on the premises of residential complex 100 and obtains power consumption in entire residential complex 100 as measured by a power measuring device (for example, a meter set at a power-receiving point of high-voltage power). In this case, the power consumption in entire residential complex 100 refers to power consumption by all facilities on the premises of residential complex 100, including a power amount consumed in each of private areas 130, a power amount consumed in common area 120, and a power amount supplied to the charging and discharging facilities. In addition, the power measuring device may measure the power amount charged or discharged in storage battery 111 of electric vehicle 110 for each electric vehicle 110.

The power measuring device measures a power amount using a current transformer (not illustrated) for measuring power flowing through a power line. The power measuring device periodically transmits measured power amounts to meter information obtainer 200. In this case, periodic transmission indicates repeated transmission at predetermined intervals. The intervals are not limited to being constant and are optionally set by a manager of residential complex 100 or the like.

Figure 2:
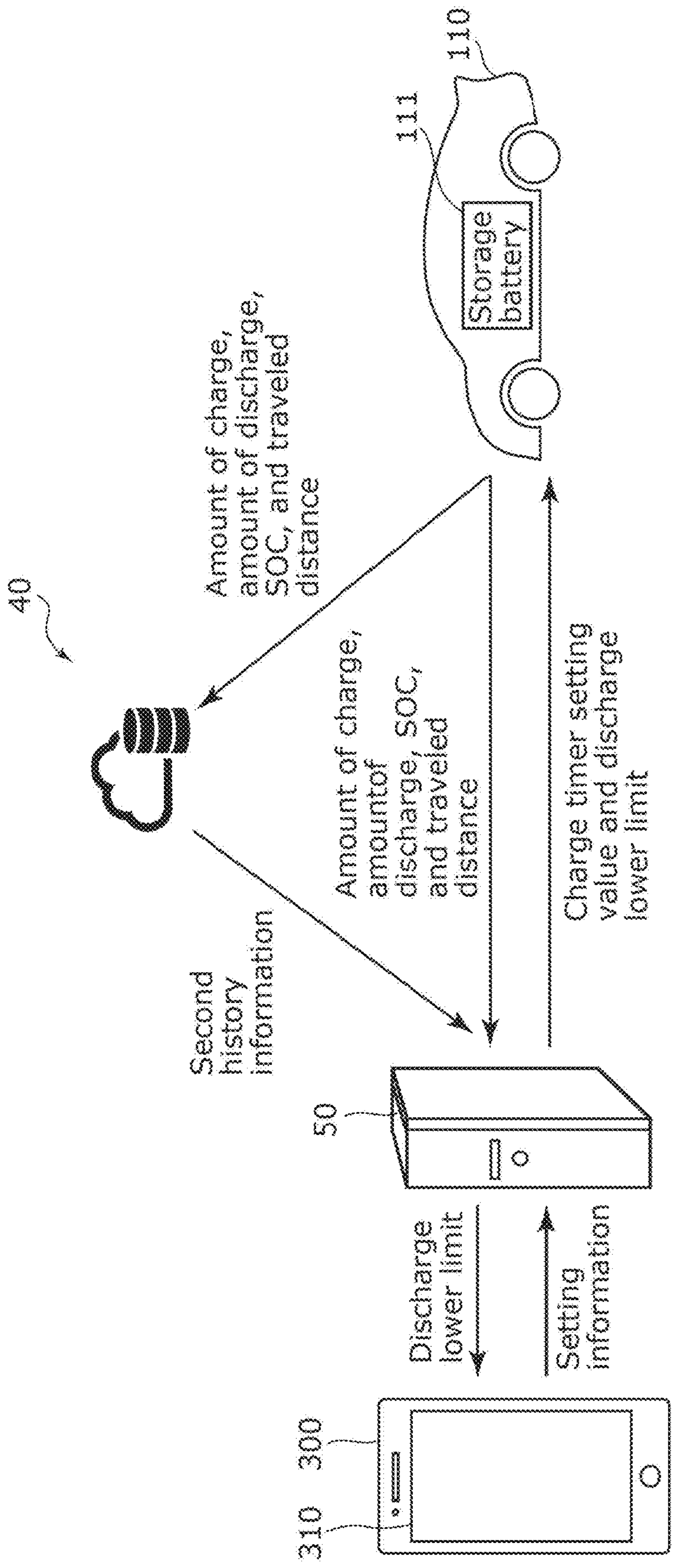
FIG. 2 is a diagram schematically illustrating transmission and reception of each item of information according to the embodiment.

FIG. 2 is a diagram schematically illustrating transmission and reception of each item of information according to the present embodiment.

As illustrated in FIG. 2, an amount of charge, an amount of discharge, and a state of charge (SOC) of storage battery 111 and a traveled distance of electric vehicle 110 are outputted from the charge and discharge facility (not illustrated) to storage battery information accumulator 40 and charge and discharge control setter 50.

The amount of charge, the amount of discharge, the SOC, and the traveled distance are examples of the storage battery information and the storage battery information need only include at least one of the amount of charge, the amount of discharge, the SOC, or the traveled distance. Note that while the storage battery information is transmitted from the charge and discharge facility to which electric vehicle 110 is connected, alternatively, the storage battery information may be transmitted by electric vehicle 110 via a wireless communicator. In addition, the amount of discharge and the SOC are examples of the information indicating a remaining battery capacity of storage battery 111 and the traveled distance is an example of the information indicating a traveled distance.

Information terminal 300 is a smartphone, a tablet terminal, or the like owned by user U and is communicably connected to charge and discharge control device 1 and electric vehicle 110. Information terminal 300 includes display 310 that is a liquid crystal display or the like and an acceptor (not illustrated) that is a button, a touch panel, a microphone, or the like.

Charge and discharge control setter 50 calculates a recommended discharge lower limit based on the second history information and notifies information terminal 300 of the calculated recommended discharge lower limit.

Display 310 of information terminal 300 displays the recommended discharge lower limit and the acceptor accepts an operation with respect to the recommended discharge lower limit from user U. For example, the acceptor accepts information indicating a remaining battery capacity that is set as the discharge lower limit. Setting information indicating the accepted information is outputted from information terminal 300 to charge and discharge control setter 50. The setting information may include information indicating that the recommended discharge lower limit is to be approved or a value of a discharge lower limit desired by user U.

In addition, information based on the discharge lower limit set in charge and discharge control setter 50 is outputted to the charge and discharge facility to which electric vehicle 110 is connected or to electric vehicle 110. Note that while it is illustrated in FIG. 2 as if information based on the discharge lower limit is directly outputted from charge and discharge control setter 50 to electric vehicle 110 (or the charge and discharge facility to which electric vehicle 110 is connected), in reality, information based on the discharge lower limit is outputted from charge and discharge control device 1.

Note that the setting information may include a charge timer setting value in place of the discharge lower limit or together with the discharge lower limit. The charge timer setting value is a setting value for setting when to charge so that the remaining battery capacity reaches a desired percentage and includes the remaining battery capacity and a date and time to be a limit for completion of the charge to the desired remaining battery capacity. The date and time to be a limit are, for example, a date and time after performing a discharge in a time slot in which power is scarce. In addition, the charge timer setting value is outputted from charge and discharge control setter 50 to electric vehicle 110.

Figures 3, 4:
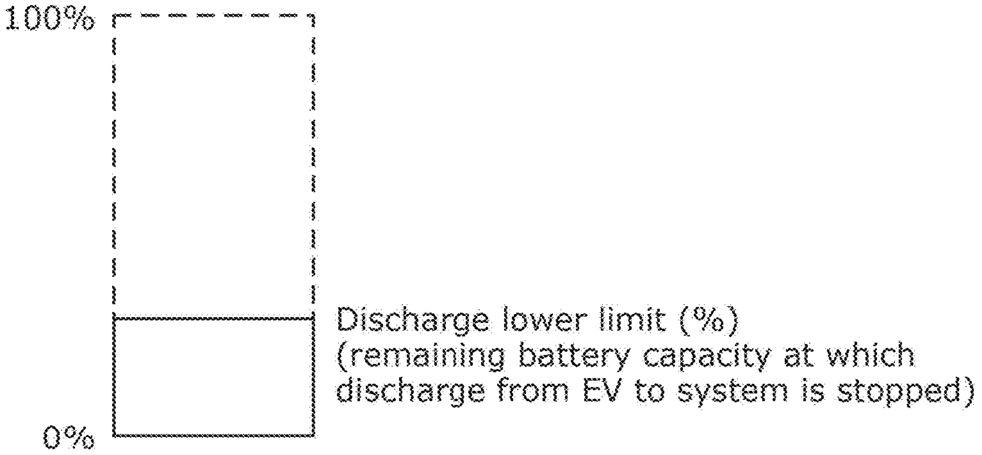
FIG. 3 is a diagram illustrating an example of second history information according to the embodiment.
FIG. 4 is a diagram for describing a discharge lower limit according to the embodiment.

FIG. 3 is a diagram illustrating an example of the second history information according to the present embodiment. FIG. 3 illustrates a history (time-series data) of storage battery information accumulated in storage battery information accumulator 40 with respect to one electric vehicle 110.

As illustrated in FIG. 3, the second history information includes a date, a time of day, a remaining battery capacity (corresponding to a SOC), and a traveled distance.

The date and the time of day indicate a date and time at which the remaining battery capacity and the traveled distance were measured.

The remaining battery capacity indicates the remaining battery capacity of storage battery 111 at a measurement time. For example, the remaining battery capacity indicates a percentage of a remaining storage capacity of storage battery 111 at the current time when a fully charged state is 100% and a fully discharged state is 0%.

The traveled distance indicates a cumulative value of the traveled distance of electric vehicle 110 at the measurement time.

For example, the remaining battery capacity at 7:00 on March 2 being 80% and the remaining battery capacity at 1:30 on March 5 being 40% show that, on average, electric vehicle 110 consumes 13% of its power amount per day. In addition, the traveled distance at 7:00 on March 2 being 6500 km and the traveled distance at 1:30 on March 5 being 6600 km show that, on average, the traveled distance of electric vehicle 110 per day is 33 km. Furthermore, electricity efficiency of electric vehicle 110 can also be determined from the traveled distance and the remaining battery capacity. Moreover, it is also shown that charging is performed from 1:00 to 7:00 on March 2 and from 1:30 to 7:00 on March 5 or, in other words, electric vehicle 110 is not in use during these periods.

Note that the calculation is not limited to an average daily power consumption and power consumption in the form of a daily mode, median, or the like may be calculated instead.

Note that the traveled distance may be calculated from a history of routes traveled by electric vehicle 110 or calculated from an odometer value or a latitude longitude value of a global positioning system (GPS). The traveled routes, the odometer value, and the latitude longitude value of a GPS are examples of the information indicating a traveled distance.

As described above, the second history information may include history of information indicating a remaining battery capacity and information indicating a traveled distance. In addition, the second history information may further include information such as calendar information and weather information. The calendar information includes the day of the week (for example, whether it is a weekday or a holiday), national holidays, and information on year-end and New Year's holidays. The weather information includes temperature, humidity, and weather.

FIG. 4 is a diagram for describing a discharge lower limit according to the present embodiment.

As illustrated in FIG. 4, the discharge lower limit is the remaining battery capacity (%) that serves as the threshold to stop discharge for supplying power from storage battery 111 of electric vehicle 110 to residential complex 100 when the fully charged state is 100% and the fully discharged state is 0%. For example, the discharge lower limit is the remaining battery capacity that is estimated to allow electric vehicle 110 to travel the following day under normal usage (normal power consumption) (a remaining battery capacity that is estimated not to run out of power the following day). Note that the discharge lower limit is not limited to being expressed as a percentage but may also be expressed in terms of a remaining storage capacity (kWh).

Note that the discharge lower limit according to the present Description differs from a discharge lower limit set to electric vehicle 110 in advance. The discharge lower limit set in advance is, for example, a discharge lower limit commonly set for a model of electric vehicle 110 or the like.

2. Operation of Charge and Discharge Control Device

Figure 5:
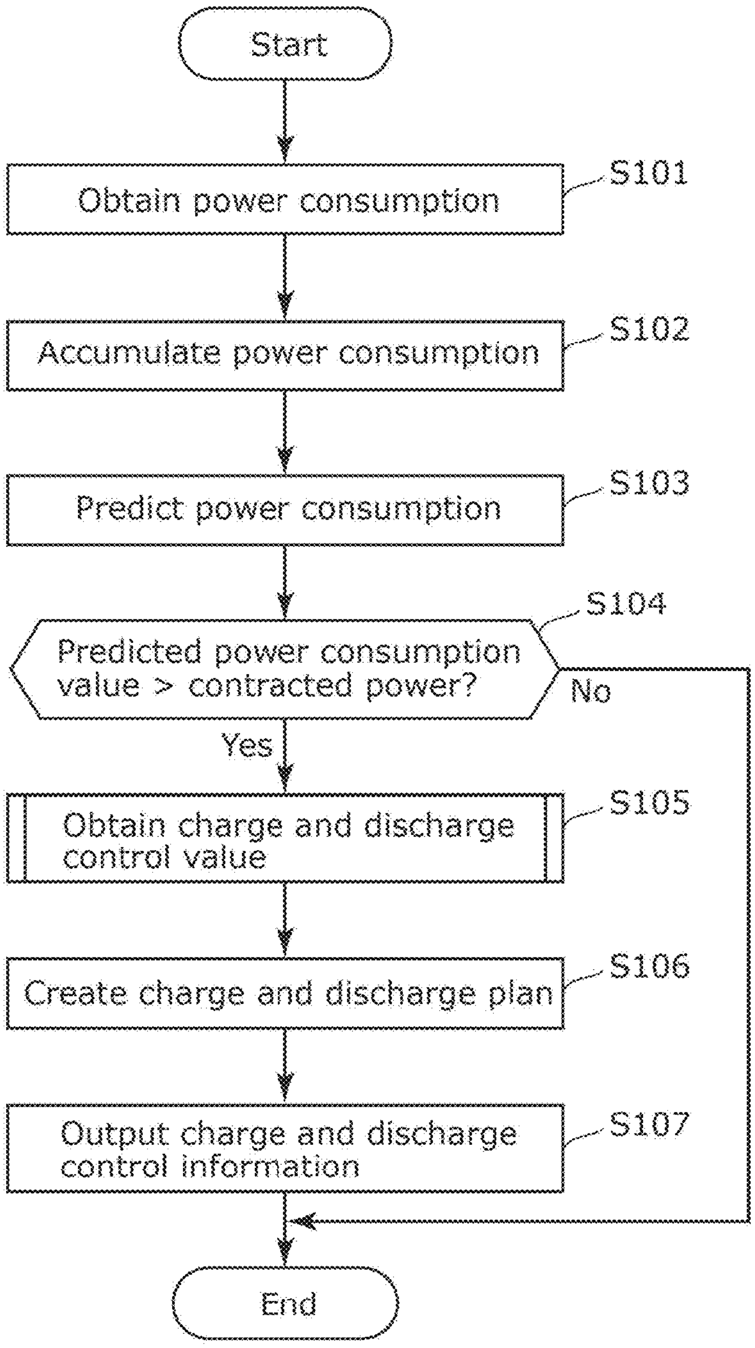
FIG. 5 is a flowchart illustrating an example of an operation of the charge and discharge control device according to the embodiment.

Next, an operation of charge and discharge control device 1 configured as described above will be described with reference to FIGS. 1, 2, and 5 to 11. FIG. 5 is a flowchart illustrating an example of an operation (charge and discharge control method) of charge and discharge control device 1 according to the present embodiment.

As illustrated in FIG. 5, power consumption obtainer 10 obtains power consumption of residential complex 100 via meter information obtainer 200 (S101). For example, power consumption obtainer 10 periodically obtains the power consumption.

Next, power amount accumulator 20 accumulates the power consumption obtained in step S101 (S102). For example, power amount accumulator 20 adds the power consumption obtained in step S101 to the first history information. Power amount accumulator 20 may further add calendar information, weather information, or the like to the first history information in association with the power consumption.

Next, power amount predictor 30 predicts power consumption (first power consumption) of residential complex 100 during a target period in the future based on the first history information (S103). In the present embodiment, power amount predictor 30 predicts a power consumption for every 30 minutes on the following day.

Power amount predictor 30 predicts the power consumption of the target period based on, for example, past power consumption when environmental information is the same as or similar to that of the target period. The environmental information includes, but is not limited to, calendar information or weather information. For example, power amount predictor 30 may predict the power consumption using at least one of the calendar information or the weather information.

When the following day is a weekday, power amount predictor 30 may, for example, extract the power consumption of the last several weekdays (for example, the same day of the week) from the first history information and predict the power consumption for the target period based on the extracted power consumption or power amount predictor 30 may extract the power consumption of weekdays in the past same month or the past same week from the first history information and predict the power consumption for the target period based on the extracted power consumption. In addition, the power consumption for the target period may be calculated as a statistic value of a plurality of values of past power consumption. While the statistic value is, for example, a mean value, the statistic value may be a maximum value, a minimum value, a mode, a median, or the like or a value obtained by calculating the values with a predetermined value.

Next, power amount predictor 30 determines whether or not the predicted value of the power consumption (predicted power consumption value) predicted in step S103 exceeds the contracted power (S104). Power amount predictor 30 makes the determination of step S104 in each of the 30-minute periods of the following day.

Note that while an example of making a determination using the contracted power was described in step S104, the determination is not limited to using the contracted power and may be made based on an upper limit value of the power consumption set by the manager of residential complex 100.

Charge and discharge control setter 50 obtains a charge and discharge control value with respect to each of the time slots (each time slot is for every 30 minutes of the following day and is an example of the first period) for which a determination of Yes has been made in step S104 by power amount predictor 30 (S105). The charge and discharge control value is a discharge lower limit approved by user U or a discharge lower limit inputted by user U. In addition, the charge and discharge control value is a discharge lower limit used when creating a charge and discharge plan. Processing of step S105 will be described later. Charge and discharge control setter 50 outputs the obtained charge and discharge control value to charge and discharge planner 60. Note that a determination of Yes made in step S104 means that power is predicted to be scarce and the first period is a time slot in which power is predicted to be scarce.

Next, charge and discharge planner 60 creates a charge and discharge plan for the following day based on the charge and discharge control value obtained in step S105 (S106), and outputs the charge and discharge plan to charge and discharge controller 70. Charge and discharge planner 60 creates a charge and discharge plan that suppresses charging and discharges electric vehicle 110 during the time slot in which the predicted power consumption value exceeds the contracted power. When there are a plurality of electric vehicles 110, charge and discharge planner 60 creates a charge and discharge plan based on the charge and discharge control value for each of the plurality of electric vehicles 110 so that the power consumption in the first period is equal to or less than the contracted power.

Charge and discharge planner 60 may specify electric vehicles 110 that will not be used in the first period based on daily usage history of each of the plurality of electric vehicles 110 and may create a charge and discharge plan so that specified electric vehicles 110 are preferentially discharged. In addition, charge and discharge planner 60 may create a charge and discharge plan so as to discharge each of one or more electric vehicles 110 connected to the charge and discharge facility prior to the start of the first period in accordance with the discharge lower limit.

Next, charge and discharge controller 70 generates charge and discharge control information for controlling the charge and discharge facility installed in residential complex 100 based on the charge and discharge plan and outputs the generated charge and discharge control information to the charge and discharge facility or to electric vehicle 110 (storage battery 111) connected to the charge and discharge facility (S107). The charge and discharge control information includes a command value when suppressing charge (chargeable amount) and a command value when performing a discharge (discharge lower limit or amount of discharge).

Figure 6:
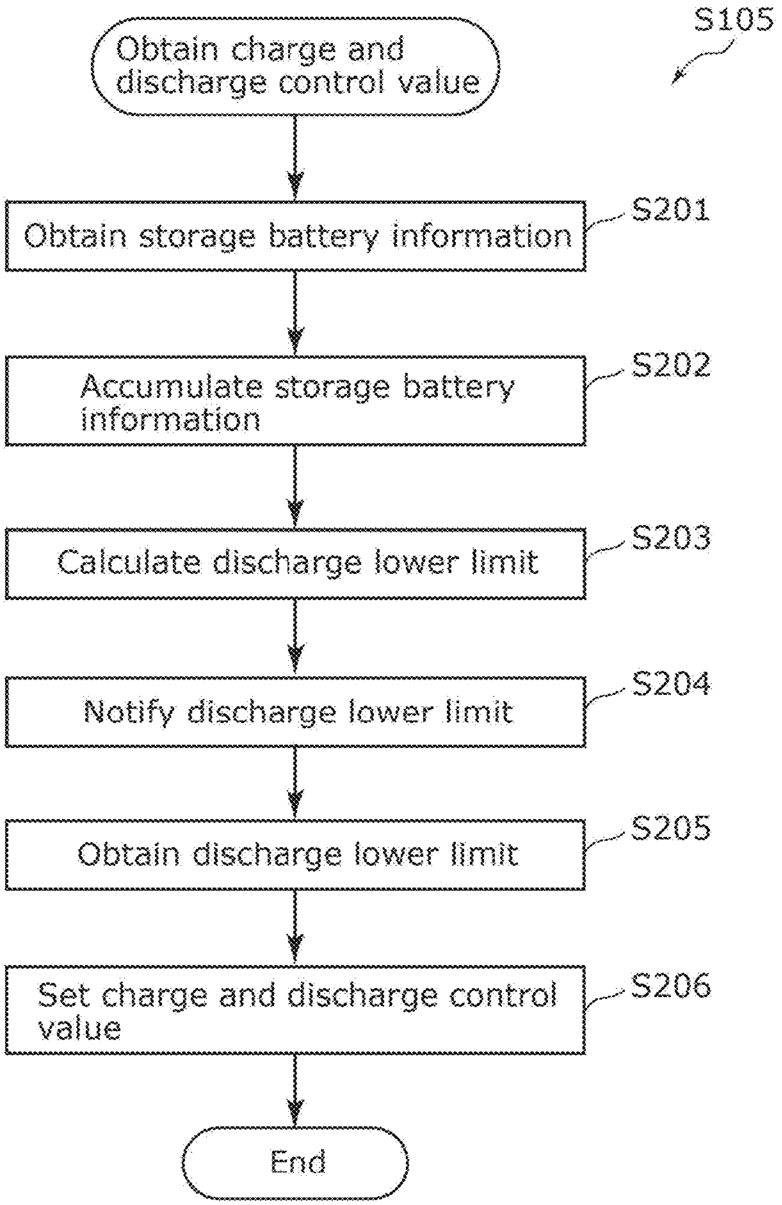
FIG. 6 is a flowchart illustrating details of the operation of step S105 illustrated in FIG. 5.

Next, specific processing of step S105 illustrated in FIG. 5 will be described with reference to FIGS. 6 and 7. FIG. 6 is a flowchart illustrating details of the operation (charge and discharge control method) of step S105 illustrated in FIG. 5. The processing illustrated in FIG. 6 is executed for each electric vehicle 110. In addition, steps S201 and S202 illustrated in FIG. 6 are processing steps executed periodically and executed regardless of a result of the determination in step S104.

As illustrated in FIG. 6, storage battery information accumulator 40 obtains storage battery information of storage battery 111 (S201), and accumulates the obtained storage battery information (S202). When there are a plurality of electric vehicles 110 in residential complex 100, storage battery information accumulator 40 obtains storage battery information including identification information of each electric vehicle 110 (or storage battery 111) and accumulates the storage battery information for each electric vehicle 110.

Next, triggered by a determination of Yes made in step S104 (refer to FIG. 5), charge and discharge control setter 50 extracts the history of the storage battery information (second history information) when the environmental information is the same as or similar to the first period for which the determination of Yes was made in step S104, and based on the extracted second history information, calculates the discharge lower limit in the first period (S203).

Charge and discharge control setter 50 may predict (calculate) a power amount that is consumed in one day (for example, an average daily power amount) by electric vehicle 110 based on the second history information and may calculate the discharge lower limit based on the predicted power amount. The discharge lower limit may be calculated as a statistic value of a plurality of values of past power consumption in electric vehicle 110. While the statistic value is, for example, a mean value, the statistic value may be a maximum value, a minimum value, a mode, a median, or the like or a value obtained by calculating the values with a predetermined value. The power amount that is consumed in one day is an example of the second power consumption.

In addition, charge and discharge control setter 50 may predict (calculate), based on the second history information, a power amount that is consumed by electric vehicle 110 in a second period following the discharge in the first period and may calculate the discharge lower limit based on the predicted power amount. The second period is, for example, a period until storage battery 111 of electric vehicle 110 is charged (for example, a time of day at which a charge is predicted to be performed) after discharge in the first period. The time of day at which storage battery 111 of electric vehicle 110 is to be charged after discharge in the first period may be predicted from the second history information or predicted from schedule information indicating a plan to use electric vehicle 110. The power amount that is consumed in the second period is an example of the second power consumption.

Note that charge and discharge control setter 50 may further predict the second power consumption when electric vehicle 110 uses the air conditioner. Charge and discharge control setter 50 may, for example, predict the second power consumption when the air conditioner is used by calculating the power consumption of the air conditioner on the following day based on weather information for the following day and the power consumption of the air conditioner (for example, a catalog value) and adding the calculated amount to the power consumption calculated based on the second historical information. In addition, charge and discharge control setter 50 may, for example, predict the second power consumption when the air conditioner is used by calculating the power consumption of the air conditioner in the second period based on weather information for the second period and the power consumption of the air conditioner (for example, a catalog value) and adding the calculated amount to the power consumption calculated based on the second historical information. In this case, charge and discharge control setter 50 functions as the third obtainer that obtains weather information for the target period (for example, all day the following day) or for the second period.

Note that when the second history information includes a traveled distance greater than or equal to a predetermined distance, charge and discharge control setter 50 may predict the power amount to be consumed in one day or in the second period based on the second history information excluding the traveled distance greater than or equal to the predetermined distance. For example, the predetermined distance may be set in advance based on a past mean or set in advance by user U. In this manner, when the traveled distance is greater than or equal to a predetermined distance, charge and discharge control setter 50 may determine that the traveled distance is a singular value and predict the power amount to be consumed in one day or in the second period without using the traveled distance. The singular value refers to, for example, the traveled distance when driving in a manner that differs from normal such as when driving for leisure. Note that the traveled distance here is a distance traveled by electric vehicle 110 in a predetermined period. Although not particularly limited, the predetermined period may be, for example, one hour, the second period, or one day.

Note that, for example, charge and discharge control setter 50 may predict the power amount to be consumed in one day or in the second period using at least one of the calendar information or the weather information.

Note that when there are a plurality of first periods for which a determination of Yes was made in step S104 on the following day, charge and discharge control setter 50 may individually calculate the discharge lower limit for each of the plurality of first periods.

Next, charge and discharge control setter 50 notifies user U of electric vehicle 110 of the calculated discharge lower limit (S204). When there are a plurality of electric vehicles 110 in residential complex 100, charge and discharge control setter 50 notifies each of users U of the plurality of electric vehicles 110 of the discharge lower limit of electric vehicle 110 owned by user U. For example, charge and discharge control setter 50 outputs information indicating the discharge lower limit to information terminal 300 of user U via a communicator (not illustrated). For example, the communicator includes a wireless communication circuit (wireless communication module).

Figure 7:
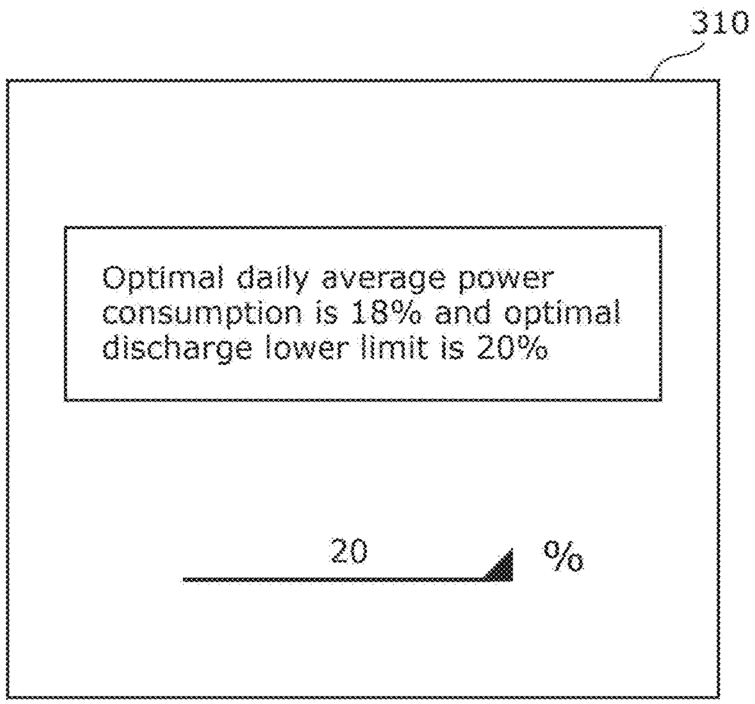
FIG. 7 is a diagram illustrating a first example of information to be displayed on a display of an information terminal of a user.

FIG. 7 is a diagram illustrating a first example of information to be displayed on display 310 of information terminal 300 of user U. FIG. 7 illustrates a screen displaying information notified to user U in step S204.

As illustrated in FIG. 7, a value of average daily power consumption and a recommended discharge lower limit are displayed on display 310. The example in FIG. 7 represents an example in which the average daily power consumption is 18% and the recommended discharge lower limit is 20%. Display 310 may further perform a selection display (for example, a display of "No" and "Yes" or a display of a numeric keypad) for allowing user U to input whether or not the discharge lower limit is to be set to 20% (whether or not the recommended discharge lower limit is to be adopted as the charge and discharge control value).

Referring to FIG. 6 once again, next, charge and discharge control setter 50 obtains the discharge lower limit (S205). Charge and discharge control setter 50 may obtain the discharge lower limit notified to user U in step S204 as the discharge lower limit to be used to create a charge and discharge plan. In other words, charge and discharge control setter 50 may automatically obtain the discharge lower limit (remaining battery capacity) calculated in step S203 as the discharge lower limit (charge and discharge control value) to be used to create a charge and discharge plan.

In addition, when a selection display is displayed on display 310, charge and discharge control setter 50 may obtain the discharge lower limit based on a selection result (notification result) of user U. When the selection result by user U indicates approval of the notified discharge lower limit, charge and discharge control setter 50 obtains the discharge lower limit notified to user U in step S204 as the discharge lower limit (charge and discharge control value) to be used to create a charge and discharge plan. Alternatively, when the selection result by user U indicates that a different value from the notified discharge lower limit is to be adopted as the discharge lower limit to be used to create a charge and discharge plan, charge and discharge control setter 50 obtains the different value as the discharge lower limit to be used to create a charge and discharge plan.

Next, charge and discharge control setter 50 sets a charge and discharge control value based on the discharge lower limit obtained in step S205 (S206), and outputs the charge and discharge control value to charge and discharge planner 60. In the present embodiment, charge and discharge control setter 50 sets the discharge lower limit obtained in step S205 as the charge and discharge control value. Charge and discharge control setter 50 can be described as determining the discharge lower limit obtained in step S205 as the charge and discharge control value. In addition, charge and discharge control setter 50 functions as the outputter.

As described above, since charge and discharge control setter 50 uses the second history information to set the discharge lower limit, for example, a suitable discharge lower limit can be set for each user, for each item of calendar information, or the like. Note that the discharge lower limit can vary from one time slot to the next, from one item of calendar information to the next, from one item of weather information to the next, or the like even with respect to one electric vehicle 110.

Note that in step S204, in addition to the notification of the discharge lower limit, information inquiring whether or not to make a discharge reservation for the first period may be transmitted.

Figure 8:
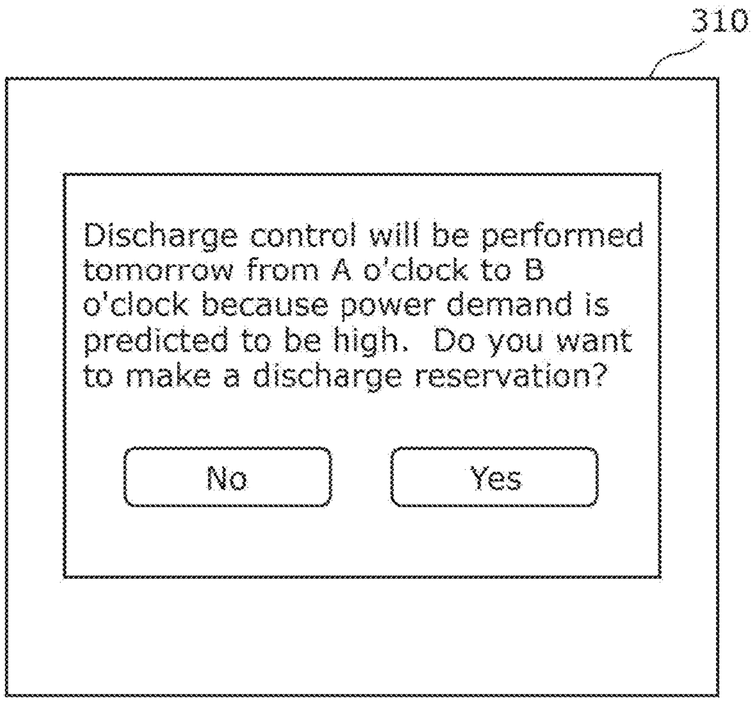
FIG. 8 is a diagram illustrating a second example of information to be displayed on the display of the information terminal of the user.

FIG. 8 is a diagram illustrating a second example of information to be displayed on display 310 of information terminal 300 of user U. FIG. 8 illustrates a screen displaying information further transmitted to user U in step S204.

As illustrated in FIG. 8, a sentence indicating that discharge control is to be performed in the first period ("tomorrow from A o'clock to B o'clock" in FIG. 8) and a sentence and selection display (display of "No" and "Yes" in FIG. 8) indicating that an inquiry will be made as to whether a discharge reservation is possible may further be displayed on display 310. In addition, display 310 may further display contents of benefits when making a discharge reservation. For example, when user U makes a discharge reservation, benefits may be granted to user U or to electric vehicle 110 owned by user U.

In addition, charge and discharge planner 60 may create a charge and discharge plan based on an obtained result of the inquiry as to whether or not a discharge reservation is to be made. Charge and discharge planner 60 may create a charge and discharge plan so that electric vehicle 110 having made a discharge reservation is preferentially discharged.

Figure 9:
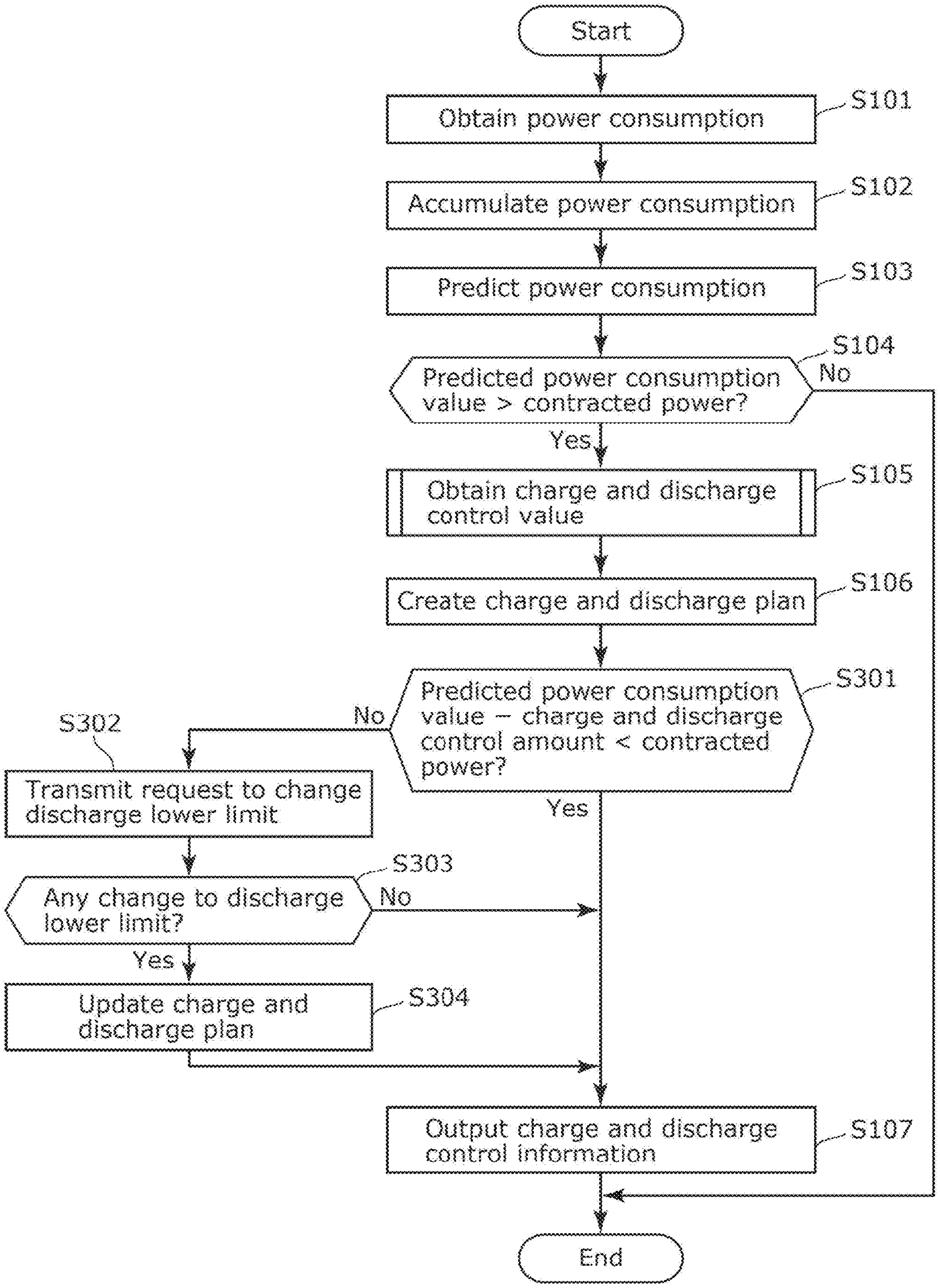
FIG. 9 is a flowchart illustrating another example of an operation of the charge and discharge control device according to the embodiment.

Next, another example of an operation of charge and discharge control device 1 will be described with reference to FIGS. 9 to 11. FIG. 9 is a flowchart illustrating another example of an operation (charge and discharge control method) of charge and discharge control device 1 according to the present embodiment. Note that since processing of steps S101 to S107 illustrated in FIG. 9 is similar to that in FIG. 5, a description thereof will be omitted or simplified.

As illustrated in FIG. 9, after creating a charge and discharge plan (S106), charge and discharge planner 60 determines whether or not a value obtained by subtracting the charge and discharge control amount from the predicted power consumption value is less than the contracted power (S301). Charge and discharge planner 60 determines whether or not the power consumption in the first period is less than the contracted power by discharging up to the discharge lower limit. Note that the charge and discharge control amount here is a sum of respective dischargeable amounts of one or more electric vehicles 110 in the first period. Each dischargeable amount is calculated as a difference between the remaining battery capacity of storage battery 111 immediately preceding the first period and the discharge lower limit.

When charge and discharge planner 60 determines that the value obtained by subtracting the charge and discharge control amount from the predicted power consumption value is less than the contracted power (Yes in S301), charge and discharge controller 70 proceeds to step S107, generates charge and discharge control information based on the charge and discharge plan created in step S106 in a similar manner to FIG. 5, and outputs the charge and discharge control information to the charge and discharge facility or to electric vehicle 110 connected to the charge and discharge facility (S107).

In addition, when charge and discharge planner 60 determines that the value obtained by subtracting the charge and discharge control amount from the predicted power consumption value is not less than the contracted power (No in S301), charge and discharge planner 60 transmits a request to change the discharge lower limit to information terminal 300 of user U (S302). Charge and discharge planner 60 makes an inquiry about whether the discharge lower limit in the first period may be set lower than the discharge lower limit set based on the second historical information. For example, charge and discharge planner 60 may preferentially make an inquiry to user U of electric vehicle 110 that is predicted to be used less frequently in the first period based on the second historical information or preferentially make an inquiry to user U having made a discharge reservation. In addition, charge and discharge planner 60 may make an inquiry to user U of each of the plurality of electric vehicles 110. Furthermore, when it has been approved to set the discharge lower limit to a lower value, charge and discharge planner 60 may grant benefits to electric vehicle 110 or contents of the benefits may be displayed on display 310.

Figure 10:
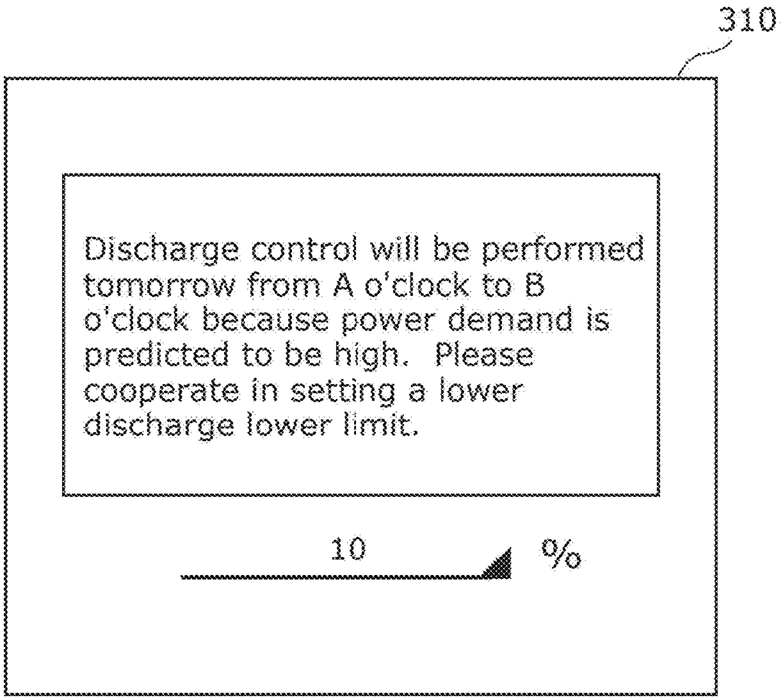
FIG. 10 is a diagram illustrating a third example of information to be displayed on the display of the information terminal of the user.

FIG. 10 is a diagram illustrating a third example of information to be displayed on display 310 of information terminal 300 of user U. FIG. 10 illustrates a screen displaying information transmitted to user U in step S302.

As illustrated in FIG. 10, a message indicating that discharge control is to be performed and a message requesting that the discharge lower limit be changed to a lower value are displayed on display 310. FIG. 10 illustrates an example of requesting that the discharge lower limit be lowered to 10% (for example, from 20% to 10%). Display 310 may further display a selection display for allowing user U to input whether or not to change the discharge lower limit to 10%.

Once again referring to FIG. 9, next, when there is a change to the discharge lower limit from user U such as when a reply that approves of lowering the discharge lower limit is obtained from user U (Yes in S303), charge and discharge planner 60 updates the charge and discharge plan based on the changed discharge lower limit (S304). Charge and discharge planner 60 updates the charge and discharge plan so as to increase a discharge amount of electric vehicle 110 for which the discharge lower limit was changed.

In addition, charge and discharge planner 60 may further update (create) the charge and discharge plan so that electric vehicle 110 to be discharged below the discharge lower limit that has been set based on the second history information (electric vehicle 110 for which a determination of Yes was made in step S303) is preferentially charged after the first period. Furthermore, for example, when there are two or more electric vehicles 110 to be discharged below the discharge lower limit that has been set based on the second history information, charge and discharge planner 60 may update (create) the charge and discharge plan to preferentially charge storage battery 111 of electric vehicle 110 that is to be used at an earlier time after the first period among two or more electric vehicles 110 as compared to storage batteries 111 of other electric vehicles 110. While the charge here refers to charging storage battery 111 of electric vehicle 110 to be discharged below the discharge lower limit to the discharge lower limit of electric vehicle 110, alternatively, for example, the charge may refer to fully charging storage battery 111 or to charging storage battery 111 to a predetermined remaining battery capacity.

For example, when three electric vehicles 110 scheduled to depart at 7 o'clock, 10 o'clock, and 12 o'clock on the following day are discharged below the discharge lower limit from 18 o'clock on the day to midnight on the following day, electric vehicles 110 scheduled to depart at 7 o'clock, 10 o'clock, and 12 o'clock on the following day are charged after midnight on the following day in that order. Charging three electric vehicles 110 after discharging below the discharge lower limit enables the likelihood that electric vehicles 110 can be charged to at least the discharge lower limit to be increased or, in other words, enables the likelihood that power will run out to be reduced.

In addition, for example, when there are two or more electric vehicles 110 to be discharged below the discharge lower limit that has been set based on the second history information, charge and discharge planner 60 may update (create) the charge and discharge plan to preferentially charge electric vehicle 110 with a larger amount of discharge below the discharge lower limit or electric vehicle 110 with a smaller remaining battery capacity after discharge among two or more electric vehicles 110.

Furthermore, charge and discharge planner 60 may further create the charge and discharge plan so as to prohibit electric vehicle 110 having a low urgency level from being charged for a period from a current time to a start of the first period. Electric vehicle 110 having a low urgency level is electric vehicle 110 that has the remaining battery capacity equal to or greater than a reference remaining capacity. When the remaining battery capacity of electric vehicle 110 at the current time can be obtained and the remaining battery capacity is equal to or greater than the reference remaining capacity, charge and discharge planner 60 may create a charge and discharge plan so that electric vehicle 110 is not charged in the period from the current time to a start of the first period.

In addition, charge and discharge controller 70 generates charge and discharge control information based on the updated charge and discharge plan and outputs the generated charge and discharge control information (S107). When prohibiting electric vehicle 110 having a low urgency level from being charged, the charge and discharge control information may include a command value indicating a reference remaining capacity for determining whether or not the urgency level is low. The reference remaining capacity may be a value common to a plurality of electric vehicles 110 or may be a separate value for each of the plurality of electric vehicles 110. The reference remaining capacity is set in advance.

Accordingly, for example, when an electric vehicle A with an almost fully charged battery and an electric vehicle B with low remaining battery capacity are connected to the charge and discharge facility and only one of the electric vehicles can be charged, the electric vehicle B can be charged without charging the electric vehicle A. Subjecting the electric vehicle B to discharge control in the first period makes it easier to solve the scarcity of power in the first period.

In addition, when there is no change to the discharge lower limit from the user (No in S303), charge and discharge planner 60 outputs the charge and discharge control information based on the charge and discharge plan created in step S106 in a similar manner to FIG. 5 (S107).

Furthermore, when a determination of No is made in step S301, information prompting electric vehicle 110 to be charged may be transmitted to information terminal 300 of user U in addition to step S302 or in place of step S302.

Figure 11:
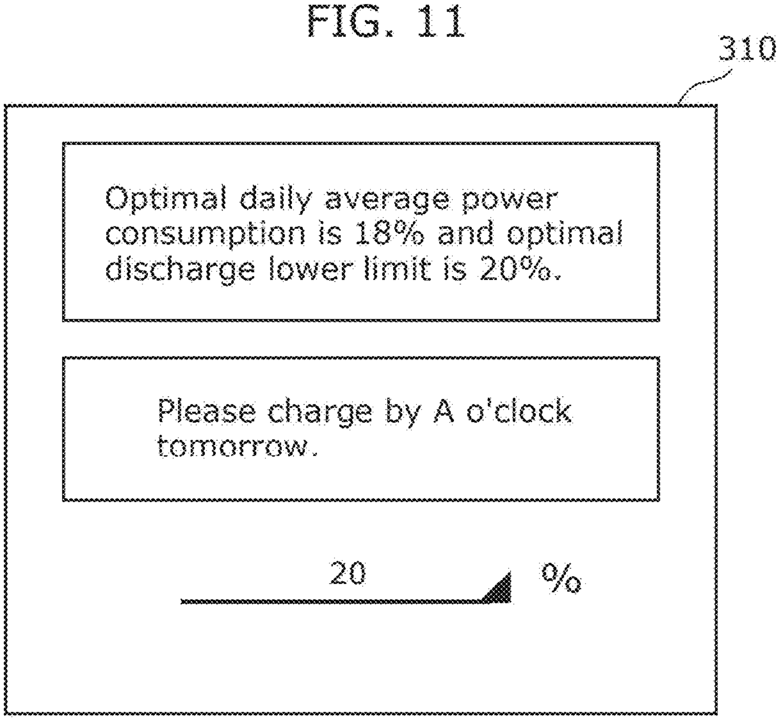
FIG. 11 is a diagram illustrating a fourth example of information to be displayed on the display of the information terminal of the user.

FIG. 11 is a diagram illustrating a fourth example of information to be displayed on display 310 of information terminal 300 of user U. FIG. 11 illustrates a screen displaying information transmitted to user U in step S302.

As illustrated in FIG. 11, information prompting a charge to be performed before the start of the first period may be displayed in addition to the information illustrated in FIG. 7. "Tomorrow at A o'clock" illustrated in FIG. 11 means a time of day of the start of the first period. Display 310 may further display a selection display for allowing user U to input whether or not to perform the charge. In addition, in step S304, the charge and discharge plan may be updated based on a selection result regarding whether or not to perform the charge. When obtaining a selection result indicating that a charge is to be performed with respect to one electric vehicle 110, charge and discharge planner 60 may adopt an amount of discharge based on the remaining battery capacity after the charge (for example, a fully charged state) as the amount of discharge of one electric vehicle 110 and update the charge and discharge plan based on the amount of discharge.

Note that the information prompting electric vehicle 110 to be charged may be preferentially transmitted to, for example, information terminal 300 of user U of electric vehicle 110 that has a value obtained by subtracting the discharge lower limit from the remaining battery capacity at the current time is small. In addition, information indicating a time required to charge the subtracted value, a time slot during which the charge and discharge facility is available, or the like may be displayed on display 310.

3. Advantageous Effects

Charge and discharge control device 1 according to the present embodiment is a charge and discharge control device that controls charge and discharge of electric vehicle 110 (an example of an electric vehicle) in residential complex 100 that includes a charge and discharge facility. Charge and discharge control device 1 includes: power consumption obtainer 10 (an example of a first obtainer) that obtains a power consumption of residential complex 100; power amount accumulator 20 (an example of a first storage) that stores first history information including a history of the power consumption of residential complex 100; power amount predictor 30 (an example of a predictor) that predicts a first power consumption of residential complex 100 in the future based on the first history information; storage battery information accumulator 40 (an example of a second obtainer and a second storage) that obtains storage battery information related to charge and discharge of storage battery 111 included in electric vehicle 110 and stores second history information including a history of the storage battery information obtained; charge and discharge control setter 50 (an example of a setter) that sets a discharge lower limit based on the second history information when power is predicted to be scarce in a first period in the future based on the first power consumption, the discharge lower limit indicating a remaining battery capacity at which to stop discharge performed for supplying power from storage battery 111 included in electric vehicle 110 to residential complex 100 in the first period; and charge and discharge planner 60 (an example of a plan creator) that creates a charge and discharge plan including the discharge in the first period, based on the first power consumption and the discharge lower limit.

Accordingly, since charge and discharge control device 1 can set the discharge lower limit in accordance with the second history information, charge and discharge control device 1 can assist in setting a more appropriate discharge lower limit.

In addition, charge and discharge control setter 50 may predict a second power consumption that is an amount of power to be consumed by electric vehicle 110 in one day, based on the second history information, and set the discharge lower limit based on the second power consumption predicted.

Accordingly, charge and discharge control device 1 can assist in setting a discharge lower limit at which electric vehicle 110 does not run out of power in one day including the first period (for example, all day the following day) as a more appropriate discharge lower limit.

In addition, the storage battery information may include information indicating a remaining battery capacity of storage battery 111 and information indicating a traveled distance of electric vehicle 110, and charge and discharge control setter 50 may predict the second power consumption, based on the second history information including a history of the information indicating the remaining battery capacity and a history of the information indicating the traveled distance.

Accordingly, since charge and discharge control device 1 uses the history of the remaining battery capacity and the traveled distance, charge and discharge control device 1 can more accurately predict a power amount consumed by electric vehicle 110 in one day. This leads to improved accuracy in calculating the discharge lower limit.

In addition, charge and discharge control setter 50 may predict, based on the second history information, a second power consumption that is an amount of power to be consumed by electric vehicle 110 in a second period following the discharge in the first period, and set the discharge lower limit based on the second power consumption predicted.

Accordingly, charge and discharge control device 1 can assist in setting a discharge lower limit at which electric vehicle 110 does not run out of power in the second period as a more appropriate discharge lower limit.

In addition, the second period is a period until storage battery 111 included in electric vehicle 110 is charged after the discharge in the first period.

Accordingly, charge and discharge control device 1 can assist in setting a discharge lower limit at which electric vehicle 110 does not run out of power after discharge and until electric vehicle 110 is next charged as a more appropriate discharge lower limit.

In addition, the storage battery information may include information indicating the remaining battery capacity of storage battery 111 and information indicating a traveled distance of electric vehicle 110, and charge and discharge control setter 50 may predict the second power consumption, based on the second history information including a history of the information indicating the remaining battery capacity and a history of the information indicating the traveled distance.

Accordingly, since charge and discharge control device 1 uses the history of the remaining battery capacity and the traveled distance, charge and discharge control device 1 can more accurately predict a power amount consumed by electric vehicle 110 in the second period. This leads to improved accuracy in calculating the discharge lower limit.

In addition, when the second history information includes a traveled distance greater than or equal to a predetermined distance, charge and discharge control setter 50 predicts the second power consumption, based on the second history information excluding the traveled distance greater than or equal to the predetermined distance.

Accordingly, since charge and discharge control device 1 uses the second history information excluding a singular value, charge and discharge control device 1 can more accurately predict the second power consumption. Since the discharge lower limit is set using the second power consumption, charge and discharge control device 1 can assist in setting a more accurate discharge lower limit as a more appropriate discharge lower limit.

In addition, electric vehicle 110 is provided with an air conditioner, and charge and discharge control setter 50 predicts the second power consumption in a case where electric vehicle 110 uses the air conditioner.

Accordingly, since the discharge lower limit that takes use of the air conditioner into consideration can be calculated, charge and discharge control device 1 can assist in setting a more appropriate discharge lower limit when use of the air conditioner is predicted such as in summer.

In addition, charge and discharge control device 1 further includes charge and discharge control setter 50 (an example of a third obtainer) that obtains weather information, wherein charge and discharge control setter 50 further predicts a power consumption of the air conditioner, based on the weather information.

Accordingly, a more accurate power consumption by the air conditioner according to weather information can be predicted. This leads to improved accuracy in calculating the discharge lower limit.

In addition, power amount predictor 30 predicts the first power consumption, further based on calendar information.

Accordingly, power amount predictor 30 can predict the first power consumption that is necessary in a target period according to calendar information such as a day of the week of the target period or whether or not the target period is a national holiday. For example, an improvement in prediction accuracy of the first power consumption can be anticipated.

In addition, charge and discharge control setter 50 may: calculate a recommended value of the discharge lower limit, based on the second history information; notify user U of electric vehicle 110 of the recommended value calculated; and set the discharge lower limit based on a notification result obtained from user U.

Accordingly, charge and discharge control device 1 can notify a recommended value of the discharge lower limit calculated based on the second history information as an indicator when user U sets the discharge lower limit. Therefore, when user U sets the discharge lower limit, charge and discharge control device 1 can assist in setting a more appropriate discharge lower limit.

In addition, charge and discharge control setter 50 may calculate, based on the second history information, the remaining battery capacity at which to stop the discharge, and set the remaining battery capacity calculated, as the discharge lower limit.

Accordingly, since charge and discharge control device 1 automatically sets the discharge lower limit based on the second history information, charge and discharge control device 1 can assist in setting a more appropriate discharge lower limit.

In addition, the information indicating the traveled distance is obtained from an odometer value or a latitude longitude value of a GPS.

Accordingly, information indicating the traveled distance can be readily obtained based on an odometer value or a latitude longitude value of a GPS.

In addition, when the frequency of use of electric vehicle 110 in the first period is predicted to be low, charge and discharge planner 60 makes an inquiry to user U of electric vehicle 110 about whether it is acceptable to set the discharge lower limit lower than a discharge lower limit that has been set based on the second history information, and creates the charge and discharge plan, based on an inquiry result obtained.

Accordingly, for example, when performing charge and discharge control does not result in the power falling to or below the contracted power, the discharge lower limit can be lowered to compensate for the shortfall. Therefore, in the perspective of more reliably making the power consumption in the first period equal to or smaller than the contracted power, charge and discharge control device 1 can assist in setting a more appropriate discharge lower limit.

In addition, electric vehicle 110 includes a plurality of electric vehicles 110, and when the plurality of electric vehicles 110 include two or more electric vehicles 110 to be discharged below the discharge lower limit that has been set based on the second history information, charge and discharge planner 60 creates the charge and discharge plan to preferentially charge storage battery 111 of, among the two or more electric vehicles 110, electric vehicle 110 that is to be used at an earlier time after the first period.

Accordingly, electric vehicle 110 with an early time of use can secure a necessary remaining battery capacity before use. Therefore, electric vehicle 110 can be inhibited from running out of power.

In addition, charge and discharge planner 60 creates the charge and discharge plan to prohibit electric vehicle 110 having a low urgency level from being charged for a period from the current time to the start of the first period.

Accordingly, electric vehicle 110 having a higher urgency level can be more reliably charged before the start of the first period.

In addition, charge and discharge planner 60 makes an inquiry to user U of electric vehicle 110 about whether it is acceptable to discharge, in the first period, storage battery 111 included in electric vehicle 110, and creates the charge and discharge plan based on the inquiry result obtained.

Accordingly, since electric vehicle 110 that is reliably discharged in the first period can be secured, a degree of certainty of discharge control can be improved.

In addition, charge and discharge control device 1 further includes charge and discharge controller 70 that issues a charge and discharge control command to the charge and discharge facility, based on the charge and discharge plan.

Accordingly, charge and discharge control device 1 can control the charge and discharge facility and the like according to a charge and discharge plan created using a more appropriately set discharge lower limit.

In addition, residential complex 100 includes a plurality of charge and discharge facilities each being the charge and discharge facility, and a plurality of electric vehicles 110 each being electric vehicle 110 are chargeable and dischargeable by the plurality of charge and discharge facilities, and charge and discharge control setter 50 sets discharge lower limits for the plurality of electric vehicles 110 and creates the charge and discharge plan based on the discharge lower limits set for the plurality of electric vehicles 110.

Accordingly, charge and discharge control device 1 can assist in setting a more appropriate discharge lower limit with respect to each of a plurality of electric vehicles 110. In addition, the created charge and discharge plan can more reliably solve a scarcity of power in the first period.

In addition, the discharge lower limit setting device according to the present embodiment is a discharge lower limit setting device that sets a discharge lower limit for use in charge and discharge control device 1 that controls charge and discharge of electric vehicle 110 in residential complex 100 that includes a charge and discharge facility. The discharge lower limit setting device includes: charge and discharge control setter 50 (an example of a setter) that sets a discharge lower limit based on history information including a history of storage battery information related to charge and discharge of storage battery 111 included in electric vehicle 110 when power is predicted, by charge and discharge control device 1, to be scarce in a first period in the future, the discharge lower limit indicating the remaining battery capacity at which to stop discharge performed for supplying power from storage battery 111 included in electric vehicle 110 to residential complex 100 in the first period; and an outputter (realized by, for example, charge and discharge control setter 50) that outputs to charge and discharge control device 1 the discharge lower limit that has been set.

Accordingly, the discharge lower limit in accordance with history information including a history of storage battery information is set. Therefore, the discharge lower limit setting device can assist in setting a more appropriate discharge lower limit.

In addition, the charge and discharge control method according to the present embodiment is a charge and discharge control method of controlling charge and discharge of electric vehicle 110 in residential complex 100 that includes a charge and discharge facility. The charge and discharge control method includes: obtaining a power consumption of residential complex 100 (S101); predicting a first power consumption of residential complex 100 in the future based on first history information including a history of the power consumption of residential complex 100 obtained (S103); obtaining storage battery information related to charge and discharge of storage battery 111 included in electric vehicle 110 (S201); setting a discharge lower limit based on second history information including a history of the storage battery information when power is predicted to be scarce in a first period in the future based on the first power consumption, the discharge lower limit indicating a remaining battery capacity at which to stop discharge performed for supplying power from storage battery 111 included in electric vehicle 110 to residential complex 100 in the first period (S206); and creating a charge and discharge plan including the discharge in the first period, based on the first power consumption and the discharge lower limit (S106). In addition, the recording medium according to the present embodiment is a non-transitory computer-readable recording medium having recorded thereon a program for causing a computer to execute the charge and discharge control method described above.

Accordingly, advantageous effects similar to those of charge and discharge control device 1 described above are produced.

Other Embodiments

Although the charge and discharge control device and so on according to one or more aspects have been described above based on an embodiment, the present invention is not limited to the embodiment. The present invention may also include forms achieved by making various modifications to the above embodiment that can be conceived by those skilled in the art, as well as forms achieved by combining constituent elements in different embodiments, without materially departing from the spirit of the present invention.

For example, while an example in which the power amount predictor predicts the power consumption of the following day has been described in the embodiment described above, the power amount predictor may predict the power consumption of the day or of two days after the following day. In addition, while an example in which the charge and discharge planner creates the charge and discharge plan for the following day has been described, the charge and discharge planner may create the charge and discharge plan for the day or for two days after the following day.

In addition, while an example in which benefits are granted when a discharge reservation is made or the like has been described in the embodiment described above, benefits may be granted with respect an electric vehicle connected to the charge and discharge facility in the first period.

Furthermore, while an example in which a request to lower the discharge lower limit is made when a determination of No is made in step S301 in FIG. 8 has been described in the embodiment described above, the request to lower the discharge lower limit may be made regardless of the result of the determination of step S301.

In addition, the storage battery information or the second history information in the embodiment described above may be obtained via, for example, an application serviced by a vehicle manufacturer.

Furthermore, the remaining battery capacity of an electric vehicle immediately before the start of the first period in the embodiment described above can be predicted based on, for example, the second history information. For example, the power amount consumed by the electric vehicle from a current time to immediately before the start of the first period may be calculated based on the second history information and the remaining battery capacity of the electric vehicle immediately before the start of the first period may be calculated based on the remaining battery capacity at the current time and the calculated power amount.

In addition, while an example in which an average power per 30 minutes is used as a maximum power demand under a high-voltage bulk power supply contract has been described in the embodiment described above, the average power is not limited to 30 minutes and the period may be appropriately determined according to, for example, contents of the contract. Furthermore, the predetermined period is also not limited to being 30 minutes.

In addition, while "power is scarce" in the embodiment described above means that the predicted power consumption value exceeds the contracted power, "power is scarce" may include the difference between the predicted power consumption value and the contracted power being equal to or smaller than a predetermined difference even when the predicted power consumption value does not exceed the contracted power.

Furthermore, the first obtainer, the second obtainer, the third obtainer, and the outputter in the embodiment described above may be realized by a communicator (not illustrated) included in the charge and discharge control device. The communicator includes a communication circuit (communication module).

Moreover, the block diagram illustrates one example of the division of functional blocks. A plurality of functional blocks may be realized as a single functional block, a single functional block may be broken up into a plurality of functional blocks, and part of one function may be transferred to another functional block. In addition, functions of a plurality of functional blocks having similar functions may be processed in parallel or by time-division by a single hardware or software product.

In addition, while an example in which the charge and discharge control device according to the embodiment described above is realized as a single device has been described, the charge and discharge control device may be realized by a plurality of devices. When the charge and discharge control device is realized by a plurality of devices, each constituent element included in the charge and discharge control device may be distributed to the plurality of devices in any way. For example, the storage battery information accumulator and the charge and discharge control setter may be realized by a different device (for example, a different server device) from the power consumption obtainer, the power amount accumulator, the power amount predictor, and the charge and discharge planner. Furthermore, a part of or all of the functions included in the storage battery information accumulator and the charge and discharge control setter may be included in an electric vehicle. For example, the charge and discharge control setter may obtain a discharge lower limit set by a processing unit included in the electric vehicle based on second history information of the storage battery of the electric vehicle. In addition, when the charge and discharge control device is realized by a plurality of devices, a communication method among the plurality of devices is not particularly limited and may be wireless communication or wired communication. Furthermore, wireless communication and wired communication may be combined among the devices.

The general or specific aspects of the charge and discharge control device and so on according to the embodiment described above may be realized using a system, a method, an integrated circuit, a computer program, or a non-transitory computer-readable recording medium such as a CD-ROM, or any combination of systems, methods, integrated circuits, computer programs, or recording media.

In addition, each constituent element may be realized as a software product, and may be typically realized as an LSI circuit, which is an integrated circuit. These may take the form of individual chips, or may be partially or entirely packaged into a single chip. LSI circuits herein may also be referred to as ICs, system LSI circuits, super LSI circuits, or ultra LSI circuits depending on the degree of integration. Moreover, the circuit integration method is not limited to LSI, and the elements may be achieved by dedicated circuits (general-purpose circuits that execute dedicated programs) or general-purpose processors. After the LSI circuits are produced, field programmable gate arrays (FPGAs) that are programmable or reconfigurable processors with which connections or settings of circuit cells inside the LSI circuits can be reconfigured may be used. Furthermore, when advancement in semiconductor technology or derivatives of other technologies brings forth a circuit integration technology which replaces LSI, it will be appreciated that such a circuit integration technology may be used to integrate the constituent elements.

A system LSI is a super multifunctional LSI manufactured by integrating a plurality of processing units on a single chip, and is specifically a computer system including, for example, a microprocessor, read only memory (ROM), and random access memory (RAM). A computer program is stored in the ROM. The system LSI circuit fulfills the functions as a result of the microprocessor operating according to the computer program.

In addition, an aspect of the present invention may be a computer program that causes a computer to execute characteristic steps included in the charge and discharge control method illustrated in any one of FIG. 5, FIG. 6, or FIG. 9.

In addition, for example, the program may be a program to be executed by a computer. Furthermore, an aspect of the present invention may be a non-transitory computer-readable recording medium having such a program recorded thereon. For example, such a program may be recorded on a recording medium and distributed. For example, by installing the distributed program in a device that includes another processor and causing the processor to execute the program, it is possible to cause the device to perform each of the processes described above.

Additional Remark (Technique 1)

A charge and discharge control device that controls charge and discharge of an electric vehicle in a residential complex that includes a charge and discharge facility, the charge and discharge control device including:

a first obtainer that obtains a power consumption of the residential complex;

a first storage that stores first history information including a history of the power consumption of the residential complex;

a predictor that predicts a first power consumption of the residential complex in future based on the first history information;

a second obtainer that obtains storage battery information related to charge and discharge of a storage battery included in the electric vehicle;

a second storage that stores second history information including a history of the storage battery information;

a setter that sets a discharge lower limit based on the second history information when power is predicted to be scarce in a first period in future based on the first power consumption, the discharge lower limit indicating a remaining battery capacity at which to stop discharge performed for supplying power from the storage battery included in the electric vehicle to the residential complex in the first period; and a plan creator that creates a charge and discharge plan including the discharge in the first period, based on the first power consumption and the discharge lower limit.

(Technique 2)

The charge and discharge control device according to technique 1, wherein the setter predicts a second power consumption that is an amount of power to be consumed by the electric vehicle in one day, based on the second history information, and sets the discharge lower limit based on the second power consumption predicted.

(Technique 3)

The charge and discharge control device according to technique 2, wherein the storage battery information includes information indicating a remaining battery capacity of the storage battery and information indicating a traveled distance of the electric vehicle, and the setter predicts the second power consumption, based on the second history information including a history of the information indicating the remaining battery capacity and a history of the information indicating the traveled distance.

(Technique 4)

The charge and discharge control device according to technique 1, wherein the setter predicts, based on the second history information, a second power consumption that is an amount of power to be consumed by the electric vehicle in a second period following the discharge in the first period, and sets the discharge lower limit based on the second power consumption predicted.

(Technique 5)

The charge and discharge control device according to technique 4, wherein the second period is a period until the storage battery included in the electric vehicle is charged after the discharge in the first period.

(Technique 6)

The charge and discharge control device according to technique 4 or 5, wherein the storage battery information includes information indicating a remaining battery capacity of the storage battery and information indicating a traveled distance of the electric vehicle, and the setter predicts the second power consumption, based on the second history information including a history of the information indicating the remaining battery capacity and a history of the information indicating the traveled distance.

(Technique 7)

The charge and discharge control device according to technique 3 or 6, wherein when the second history information includes a traveled distance greater than or equal to a predetermined distance, the setter predicts the second power consumption, based on the second history information excluding the traveled distance greater than or equal to the predetermined distance.

(Technique 8)

The charge and discharge control device according to any one of techniques 2 to 7, wherein the electric vehicle is provided with an air conditioner, and the setter predicts the second power consumption in a case where the electric vehicle uses the air conditioner.

(Technique 9)

The charge and discharge control device according to technique 8, further including:

a third obtainer that obtains weather information, wherein the setter further predicts a power consumption of the air conditioner, based on the weather information.

(Technique 10)

The charge and discharge control device according to any one of techniques 1 to 9, wherein the predictor predicts the first power consumption, further based on calendar information.

(Technique 11)

The charge and discharge control device according to any one of techniques 1 to 10, wherein the setter: calculates a recommended value of the discharge lower limit, based on the second history information; notifies a user of the electric vehicle of the recommended value calculated; and sets the discharge lower limit based on a notification result obtained from the user.

(Technique 12)

The charge and discharge control device according to any one of techniques 1 to 11, wherein the setter calculates, based on the second history information, the remaining battery capacity at which to stop the discharge, and sets the remaining battery capacity calculated, as the discharge lower limit.

(Technique 13)

The charge and discharge control device according to any one of techniques 3, 6, and 7, wherein the information indicating the traveled distance is obtained from an odometer value or a latitude longitude value of a global positioning system (GPS).

(Technique 14)

The charge and discharge control device according to any one of techniques 1 to 13, wherein when a frequency of use of the electric vehicle in the first period is predicted to be low, the plan creator makes an inquiry to a user of the electric vehicle about whether it is acceptable to set the discharge lower limit lower than a discharge lower limit that has been set based on the second history information, and creates the charge and discharge plan, based on an inquiry result obtained.

(Technique 15)

The charge and discharge control device according to technique 14, wherein the electric vehicle includes a plurality of electric vehicles, and when the plurality of electric vehicles include two or more electric vehicles to be discharged below the discharge lower limit that has been set based on the second history information, the plan creator creates the charge and discharge plan to preferentially charge the storage battery of, among the two or more electric vehicles, an electric vehicle that is to be used at an earlier time after the first period.

(Technique 16)

The charge and discharge control device according to any one of techniques 1 to 15, wherein the plan creator creates the charge and discharge plan to prohibit the electric vehicle having a low urgency level from being charged for a period from a current time to a start of the first period.

(Technique 17)

The charge and discharge control device according to any one of techniques 1 to 16, wherein the plan creator makes an inquiry to a user of the electric vehicle about whether it is acceptable to discharge, in the first period, the storage battery included in the electric vehicle, and creates the charge and discharge plan based on an inquiry result obtained.

(Technique 18)

The charge and discharge control device according to any one a charge and discharge controller that issues a charge and discharge control command to the charge and discharge facility, based on the charge and discharge plan.

(Technique 19)

The charge and discharge control device according to any one of techniques 1 to 18, wherein the residential complex includes a plurality of charge and discharge facilities each being the charge and discharge facility, and a plurality of electric vehicles each being the electric vehicle are chargeable and dischargeable by the plurality of charge and discharge facilities, and the setter sets discharge lower limits for the plurality of electric vehicles and creates the charge and discharge plan based on the discharge lower limits set for the plurality of electric vehicles.

(Technique 20)

A discharge lower limit setting device that sets a discharge lower limit for use in a charge and discharge control device that controls charge and discharge of an electric vehicle in a residential complex that includes a charge and discharge facility, the discharge lower limit setting device including:

a setter that sets a discharge lower limit based on history information including a history of storage battery information related to charge and discharge of a storage battery included in the electric vehicle when power is predicted, by the charge and discharge control device, to be scarce in a first period in future, the discharge lower limit indicating a remaining battery capacity at which to stop discharge performed for supplying power from the storage battery included in the electric vehicle to the residential complex in the first period; and an outputter that outputs to the charge and discharge control device the discharge lower limit that has been set.

(Technique 21)

A charge and discharge control method of controlling charge and discharge of an electric vehicle in a residential complex that includes a charge and discharge facility, the charge and discharge control method including:

obtaining a power consumption of the residential complex;

predicting a first power consumption of the residential complex in future based on first history information including a history of the power consumption of the residential complex obtained;

obtaining storage battery information related to charge and discharge of a storage battery included in the electric vehicle;

setting a discharge lower limit based on second history information including a history of the storage battery information when power is predicted to be scarce in a first period in future based on the first power consumption, the discharge lower limit indicating a remaining battery capacity at which to stop discharge performed for supplying power from the storage battery included in the electric vehicle to the residential complex in the first period; and creating a charge and discharge plan including the discharge in the first period, based on the first power consumption and the discharge lower limit.

(Technique 22)

A non-transitory computer-readable recording medium having recorded thereon a program for causing a computer to execute the charge and discharge control method according to technique 21.

REFERENCE SIGNS LIST

1 charge and discharge control device
10 power consumption obtainer (first obtainer)
20 power amount accumulator (first storage)
30 power amount predictor (predictor)
40 storage battery information accumulator (second storage, obtainer, second obtainer)
50 charge and discharge control setter (setter, outputter, third obtainer)
60 charge and discharge planner (plan creator)
70 charge and discharge controller
100 residential complex
110 electric vehicle (electric vehicle)
111 storage battery
U user

The invention claimed is:

1. A charge and discharge control device that controls charge and discharge of an electric vehicle in a residential complex that includes a charge and discharge facility, the charge and discharge control device comprising:

a first obtainer that obtains a power consumption of the residential complex;

a first storage that stores first history information including a history of the power consumption of the residential complex;

a predictor that predicts a first power consumption of the residential complex in future based on the first history information;

a second obtainer that obtains storage battery information related to charge and discharge of a storage battery included in the electric vehicle;

a second storage that stores second history information including a history of the storage battery information;

a setter that sets a discharge lower limit based on the second history information when power is predicted to be scarce in a first period in future based on the first power consumption, the discharge lower limit indicating a remaining battery capacity at which to stop discharge performed for supplying power from the storage battery included in the electric vehicle to the residential complex in the first period; and a plan creator that creates a charge and discharge plan including the discharge in the first period, based on the first power consumption and the discharge lower limit.

2. The charge and discharge control device according to claim 1, wherein the setter predicts a second power consumption that is an amount of power to be consumed by the electric vehicle in one day, based on the second history information, and sets the discharge lower limit based on the second power consumption predicted.

3. The charge and discharge control device according to claim 2, wherein the storage battery information includes information indicating a remaining battery capacity of the storage battery and information indicating a traveled distance of the electric vehicle, and the setter predicts the second power consumption, based on the second history information including a history of the information indicating the remaining battery capacity and a history of the information indicating the traveled distance.

4. The charge and discharge control device according to claim 1, wherein the setter predicts, based on the second history information, a second power consumption that is an amount of power to be consumed by the electric vehicle in a second period following the discharge in the first period, and sets the discharge lower limit based on the second power consumption predicted.

5. The charge and discharge control device according to claim 4, wherein the second period is a period until the storage battery included in the electric vehicle is charged after the discharge in the first period.

6. The charge and discharge control device according to claim 4, wherein the storage battery information includes information indicating a remaining battery capacity of the storage battery and information indicating a traveled distance of the electric vehicle, and the setter predicts the second power consumption, based on the second history information including a history of the information indicating the remaining battery capacity and a history of the information indicating the traveled distance.

7. The charge and discharge control device according to claim 3, wherein when the second history information includes a traveled distance greater than or equal to a predetermined distance, the setter predicts the second power consumption, based on the second history information excluding the traveled distance greater than or equal to the predetermined distance.

8. The charge and discharge control device according to claim 2, wherein the electric vehicle is provided with an air conditioner, and the setter predicts the second power consumption in a case where the electric vehicle uses the air conditioner.

9. The charge and discharge control device according to claim 8, further comprising:

a third obtainer that obtains weather information, wherein the setter further predicts a power consumption of the air conditioner, based on the weather information.

10. The charge and discharge control device according to claim 1, wherein the predictor predicts the first power consumption, further based on calendar information.

11. The charge and discharge control device according to claim 1, wherein the setter: calculates a recommended value of the discharge lower limit, based on the second history information; notifies a user of the electric vehicle of the recommended value calculated; and sets the discharge lower limit based on a notification result obtained from the user.

12. The charge and discharge control device according to claim 1, wherein the setter calculates, based on the second history information, the remaining battery capacity at which to stop the discharge, and sets the remaining battery capacity calculated, as the discharge lower limit.

13. The charge and discharge control device according to claim 3, wherein the information indicating the traveled distance is obtained from an odometer value or a latitude longitude value of a global positioning system (GPS).

14. The charge and discharge control device according to claim 1, wherein when a frequency of use of the electric vehicle in the first period is predicted to be low, the plan creator makes an inquiry to a user of the electric vehicle about whether it is acceptable to set the discharge lower limit lower than a discharge lower limit that has been set based on the second history information, and creates the charge and discharge plan, based on an inquiry result obtained.

15. The charge and discharge control device according to claim 14, wherein the electric vehicle comprises a plurality of electric vehicles, and when the plurality of electric vehicles include two or more electric vehicles to be discharged below the discharge lower limit that has been set based on the second history information, the plan creator creates the charge and discharge plan to preferentially charge the storage battery of, among the two or more electric vehicles, an electric vehicle that is to be used at an earlier time after the first period.

16. The charge and discharge control device according to claim 1, wherein the plan creator creates the charge and discharge plan to prohibit the electric vehicle having a low urgency level from being charged for a period from a current time to a start of the first period.

17. The charge and discharge control device according to claim 1, wherein the plan creator makes an inquiry to a user of the electric vehicle about whether it is acceptable to discharge, in the first period, the storage battery included in the electric vehicle, and creates the charge and discharge plan based on an inquiry result obtained.

18. The charge and discharge control device according to claim 1, further comprising:

a charge and discharge controller that issues a charge and discharge control command to the charge and discharge facility, based on the charge and discharge plan.

19. The charge and discharge control device according to claim 1, wherein the residential complex includes a plurality of charge and discharge facilities each being the charge and discharge facility, and a plurality of electric vehicles each being the electric vehicle are chargeable and dischargeable by the plurality of charge and discharge facilities, and the setter sets discharge lower limits for the plurality of electric vehicles and creates the charge and discharge plan based on the discharge lower limits set for the plurality of electric vehicles.

20. A charge and discharge control method of controlling charge and discharge of an electric vehicle in a residential complex that includes a charge and discharge facility, the charge and discharge control method comprising:

obtaining a power consumption of the residential complex;

predicting a first power consumption of the residential complex in future based on first history information including a history of the power consumption of the residential complex obtained;

obtaining storage battery information related to charge and discharge of a storage battery included in the electric vehicle;

setting a discharge lower limit based on second history information including a history of the storage battery information when power is predicted to be scarce in a first period in future based on the first power consumption, the discharge lower limit indicating a remaining battery capacity at which to stop discharge performed for supplying power from the storage battery included in the electric vehicle to the residential complex in the first period; and creating a charge and discharge plan including the discharge in the first period, based on the first power consumption and the discharge lower limit.

21. A non-transitory computer-readable recording medium having recorded thereon a program for causing a computer to execute the charge and discharge control method according to claim 20.

* * * * *